(12) United States Patent
Beloussov et al.

(10) Patent No.: US 8,856,927 B1
(45) Date of Patent: Oct. 7, 2014

(54) SYSTEM AND METHOD FOR USING SNAPSHOTS FOR ROOTKIT DETECTION

(75) Inventors: Serguei M. Beloussov, Singapore (SG); Maxim V. Lyadvinsky, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 391 days.

(21) Appl. No.: 12/954,454

(22) Filed: Nov. 24, 2010

Related U.S. Application Data

(63) Continuation-in-part of application No. 11/459,978, filed on Jul. 26, 2006, now abandoned, which is a continuation-in-part of application No. 11/382,851, filed on May 11, 2006, now Pat. No. 7,318,135, which is a continuation-in-part of application No. 10/925,928, filed on Aug. 26, 2004, now Pat. No. 7,047,380, which is a continuation-in-part of application No. 10/624,858, filed on Jul. 22, 2003, now Pat. No. 7,246,211.

(51) Int. Cl.
*G06F 21/00* (2013.01)
*G06F 21/56* (2013.01)

(52) U.S. Cl.
CPC .................................. *G06F 21/566* (2013.01)
USPC ......................................................... 726/23

(58) Field of Classification Search
None
See application file for complete search history.

(56) References Cited

U.S. PATENT DOCUMENTS

| | | | |
|---|---|---|---|
| 5,410,667 A | 4/1995 | Belsan et al. | |
| 5,649,152 A | 7/1997 | Ohran et al. | |
| 5,720,026 A | 2/1998 | Uemura et al. | |
| 5,819,292 A | 10/1998 | Hitz et al. | |
| 5,832,515 A | 11/1998 | Ledain et al. | |
| 5,835,953 A | 11/1998 | Ohran | |
| 5,905,990 A | 5/1999 | Inglett | |
| 5,996,054 A | 11/1999 | Ledain et al. | |
| 6,021,408 A | 2/2000 | Ledain et al. | |
| 6,038,639 A | 3/2000 | O'Brien et al. | |
| 6,061,770 A | 5/2000 | Franklin | |
| 6,081,875 A | 6/2000 | Clifton et al. | |
| 6,101,585 A | 8/2000 | Brown et al. | |
| 6,173,377 B1 | 1/2001 | Yanai et al. | |
| 6,205,450 B1 | 3/2001 | Kanome | |
| 6,289,356 B1 | 9/2001 | Hitz et al. | |
| 6,341,341 B1 | 1/2002 | Grummon et al. | |

(Continued)

OTHER PUBLICATIONS

A Persistent Snapshot Device Driver for Linux, Siddha et al., Proceedings of the 5th Annual Linux Showcase & Conference, Nov. 5-10, 2001.

*Primary Examiner* — Gilberto Barron, Jr.
*Assistant Examiner* — Devin Almeida
(74) *Attorney, Agent, or Firm* — Fish & Richardson P.C.

(57) ABSTRACT

A system, method and computer program product for identifying malicious code running on a computer, including an operating system running on the computer with a data storage device; and a trusted software component running simultaneously with the operating system. An online snapshot process of a current state of the data storage device copies data blocks from the storage device to intermediate storage. Processes running under the control of the operating system have access to the data storage device. A scanning procedure runs under control of the trusted software component that has access to data representing the snapshot of the data storage device from the trusted software component. The scanning procedure analyzes the snapshot of the data storage device for the malicious code, and, in response to a "write" directed to a data block in the snapshot area of the storage device, that data block is written to the intermediate storage.

17 Claims, 11 Drawing Sheets

(56) References Cited

U.S. PATENT DOCUMENTS

| | | |
|---|---|---|
| 6,618,736 B1 | 9/2003 | Menage |
| 6,665,815 B1 | 12/2003 | Goldstein et al. |
| 6,799,258 B1 | 9/2004 | Linde |
| 7,146,640 B2 | 12/2006 | Goodman et al. |
| 7,631,357 B1 * | 12/2009 | Stringham ............... 726/24 |
| 7,917,481 B1 * | 3/2011 | Kale et al. ................ 707/693 |
| 8,220,053 B1 * | 7/2012 | Sun et al. ................ 726/24 |
| 2001/0049776 A1 | 12/2001 | Maeda |
| 2002/0112134 A1 | 8/2002 | Ohran et al. |
| 2003/0005235 A1 | 1/2003 | Young |
| 2003/0115433 A1 | 6/2003 | Kodama |
| 2004/0010668 A1 | 1/2004 | Inagaki et al. |
| 2004/0230859 A1 | 11/2004 | Cochran et al. |
| 2004/0260735 A1 | 12/2004 | Martinez et al. |
| 2005/0204205 A1 | 9/2005 | Ring et al. |
| 2006/0136720 A1 | 6/2006 | Armstrong et al. |
| 2006/0136910 A1 | 6/2006 | Brickell et al. |
| 2006/0294592 A1 * | 12/2006 | Polyakov et al. ............... 726/24 |
| 2007/0005919 A1 | 1/2007 | van Riel |
| 2007/0050545 A1 | 3/2007 | Tsuboki et al. |
| 2007/0078915 A1 | 4/2007 | Gassoway |
| 2007/0100905 A1 * | 5/2007 | Masters et al. ............... 707/201 |
| 2007/0150957 A1 * | 6/2007 | Hartrell et al. ............... 726/24 |
| 2007/0271610 A1 | 11/2007 | Grobman |

* cited by examiner

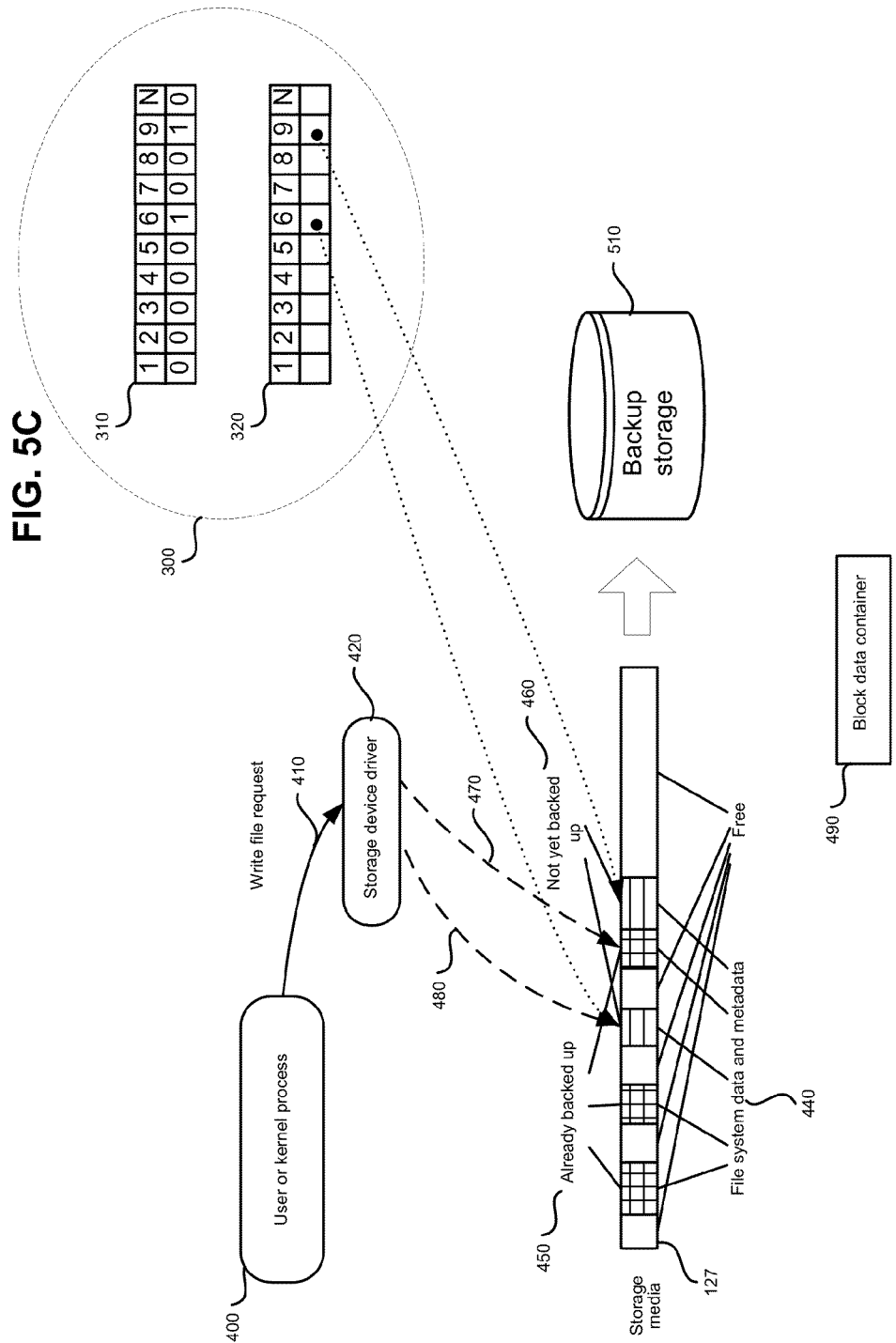

SYSTEM AND METHOD FOR USING SNAPSHOTS FOR ROOTKIT DETECTION

CROSS-REFERENCE TO RELATED APPLICATIONS

This application is a continuation in part of U.S. patent application Ser. No. 11/459,978, Filed: Jul. 26, 2006, which is a continuation-in-part of U.S. patent application Ser. No. 11/382,851; Filed: May 11, 2006, entitled SYSTEM AND METHOD FOR USING FILE SYSTEM SNAPSHOTS FOR ONLINE DATA BACKUP, which is a continuation of U.S. patent application Ser. No. 10/925,928, filed Aug. 26, 2004, entitled SYSTEM AND METHOD FOR USING FILE SYSTEM SNAPSHOTS FOR ONLINE DATA BACKUP, which is a continuation-in-part of U.S. patent application Ser. No. 10/624,858, filed Jul. 22, 2003, entitled SYSTEM AND METHOD FOR USING FILE SYSTEM SNAPSHOTS FOR ONLINE DATA BACKUP, which is incorporated herein by reference in its entirety.

BACKGROUND OF THE INVENTION

1. Field of the Invention

The present invention relates to detection of rootkits and other malware.

2. Background Art

Typically, an operating system of a computer system includes a file system to provide users with an interface while working with data on the computer system's disk and to provide the shared use of files by several users and processes. Generally, the term "file system" encompasses the totality of all files on the disk and the sets of data structures used to manage files, such as, for example, file directories, file descriptors, free and used disk space allocation tables, and the like. Accordingly, end users generally regard the computer file system as being composed of files and a number of directories. Each file usually stores data and is associated with a symbolic name. Each directory may contain subdirectories, files or both. The files and directories are typically stored on a disk or similar storage device. File systems may provide several functions. As discussed above, the most basic task of a file system is to provide access to files. File systems may also enhance system performance with additional functions such as, for example, caching, access markers and fault-tolerance.

Operating systems such as UNIX, Linux and Microsoft Windows manage computer file systems by defining a file object hierarchy. A file object hierarchy begins with a root directory and proceeds down the file tree.

The file address is then described as an access path, e.g., a succession of directories and subdirectories leading to the file. This process of assigning a file address is called access path analysis or path traverse. For instance, the path "/r/a/b/file" contains the root directory (/), subdirectories "r", "a" and "b" and then the file. Typically, the processes within an operating system interact with the file system with a regular set of functions. For example, these functions usually include open, close, write and other system calls. For instance, a file may be opened by the open functions and this function acquires the file name as a target.

The FAT (file allocation table) file system in MS-DOS uses a throughwrite algorithm, in which renewals are performed immediately, e.g., the cache memory is written to at the same time as main memory. Unlike careful write, this method does not demand input operations sorting from the file system to prevent a violation of integrity. The main advantage of file systems with careful write is that, in case of a failure, the disk volume remains intact and can still be used—an intermediate launch of a volume recovery utility is not required. A volume recovery utility is needed for correction of predictable, non-destructive failures of the disk integrity that occur as a result of a failure. But this type of utility can generally be run at any time, usually when the system reboots. However, file systems with careful write have some disadvantages such as, for example, low performance, redundant non-optimized accesses to a disk, among other drawbacks.

Generally, NTFS supports recovery of the file system using the concept of an atomic transaction. An atomic transaction is an operation in which either all of the steps in the operation succeed, or they all fail, e.g., either all actions of the transaction happen or none happen. Atomic transactions are commonly used to perform data modifications in a data store, where either all the data relating to the operation is successfully modified, or none of it is modified and the data remains as it was before the operation started. Accordingly, single changes on the disk composing a transaction may be performed atomically, e.g., during the transaction, all required changes are to be moved to disk. If the transaction is interrupted by a file system failure, modifications performed by the current moment are cancelled. After back-off, the database returns to the initial consistent state that it possessed before the transaction began.

Examples of journalled file systems include ReiserFS, JFS, XFS (Extended File System), ext3 and NTFS. A journaling file system may relocate the journal to another independent device to provide asynchronous access for the purposes of optimization. For instance, XFS and ReiserFS may use relocated journals.

The development of file systems demonstrates that fault-tolerance and recoverability of file systems after failures are important design considerations. To provide maximum reliability, it is necessary to periodically copy all files as an immediate copy or cast of the file system, e.g., a snapshot. By its functionality, a snapshot is very similar to the journal of a recoverable file system, as they can both restore the system to the integral state. A snapshot guarantees full data recovery, but incurs high expenses in creation and storage.

Snapshot creation generally involves sector by sector copying of the whole file system, i.e., service information and data. If the file system is currently active, then files may be modified during copying—some files can be open for writing or locked, for example. In the simplest case, the file system can be suspended for some time and during that time a snapshot is recorded. Of course, such an approach cannot be applied to servers where uninterruptible activity of the file system is necessary.

A rootkit is a set of software tools frequently used by a third party (usually an intruder) after gaining access to a computer system. These tools are intended to conceal running processes, files or system data, which helps an intruder maintain access to a system without the user's knowledge. Rootkits are known to exist for a variety of operating systems such as Linux, Solaris and versions of Microsoft Windows. A computer with a rootkit on it is called a "rooted" computer.

The term "rootkit" (also written as "root kit") originally referred to a set of recompiled Unix tools such as "ps," "netstat," "w" and "passwd" that would carefully hide any trace of the intruder that those commands would normally display, thus allowing the intruders to maintain "root" on the system without the system administrator even seeing them. Generally now the term is not restricted to Unix-based operating systems, as tools that perform a similar set of tasks now exist for non-Unix operating systems such as Microsoft Windows (even though such operating systems may not have a "root" account).

A rootkit typically hides logins, processes, files, and logs and may include software to intercept data from terminals, network connections, and the keyboard.

Rootkits come in three different flavors: kernel, library and application level kits. Kernel level Rootkits add additional code and/or replace a portion of kernel code with modified code to help hide a backdoor on a computer system. This is often accomplished by adding new code to the kernel via a device driver or loadable module, such as Loadable Kernel Modules in Linux or device drivers in Microsoft Windows. Library rootkits commonly patch, hook, or replace system calls with versions that hide information about the attacker. Application level rootkits may replace regular application binaries with trojanized fakes, or they may modify the behavior of existing applications using hooks, patches, injected code, or other means. Kernel rootkits can be especially dangerous because they can be difficult to detect without appropriate software.

In any case, rootkits are usually written to the disk storage for activation after operating system restart and are hidden from the operating system during requests to the file system.

The present invention is therefore related to an operating system malware monitoring means and may be used when the operating system is exposed to attack by malicious software than could not be detected by the conventional means. "Rootkits" are difficult to detect because they are activated before the operating system has completely booted up and often allows the installation of hidden files, processes and hidden user accounts in the systems OS. Rootkits are usually embedded in operating system processes in a "filter-like" manner, so that any regular detection means of the operating system cannot get information related to hidden software or software pieces.

One of the difficulties with detecting rootkits is due to the fact that, unlike viruses, rootkits typically activate themselves when the operating system is loaded upon start up of the computer, and rootkits usually acquire system privileges. Also, rootkits typically take steps to mask their existence, and prevent conventional antivirus detection mechanisms from identifying their existence. For example, a typical antivirus program invokes a system function call to identify the processes that are currently running. The rootkit intercepts the function call, and provides its own return parameters to the antivirus software, but masks its own process. Also, the rootkit typically hides the files in which it is stored from conventional antivirus mechanisms that check whether files contain known virus signatures—in other words, the files where the rootkit is stored are never actually checked by the antivirus software. This makes rootkits particularly difficult to detect and handle.

The most common way to detect rootkits is by using snapshot in common with another file system driver for scanning disk operating system and data stored on the disk drive, so rootkit and/or virus will not be able to intercept antivirus request for virus/rootkit files.

Note that a search for hidden virus/rootkit files from the operating system and file system can be used/

Also note that search for virus/rootkit files and part of files can be used with using a data base(s) of an antivirus(es) or known virus/rootkit file names, part of file names, part of files.

This method has a significant disadvantage, since analysis of permanently changed content of the disk drive cannot be completed at any point in time. On the other hand, offline analysis of the disk content is sometimes unacceptable, if a server or computer needs to be disconnected from a network for a long time.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 5A-5C illustrates an exemplary embodiment of the online backup process that addresses the shortcomings of offline data backup.

DETAILED DESCRIPTION OF EMBODIMENTS OF THE INVENTION

Reference will now be made in detail to the embodiments of the present invention, examples of which are illustrated in the accompanying drawings.

A computer file system is located on the data storage device and interacts with storage device at a block level. For example, read and write operations are performed in connection with data areas that have sizes that are divisible by the size of an individual block. The sequence of the blocks in the storage is ordered and each block has its own number. The computer system can include several such storage devices and the file system can take only a portion of one such a storage, the whole storage, or several such storages or parts thereof. On a disk or a storage device, these types of storages are usually located in partitions, taking the entire partition.

Figure 1:
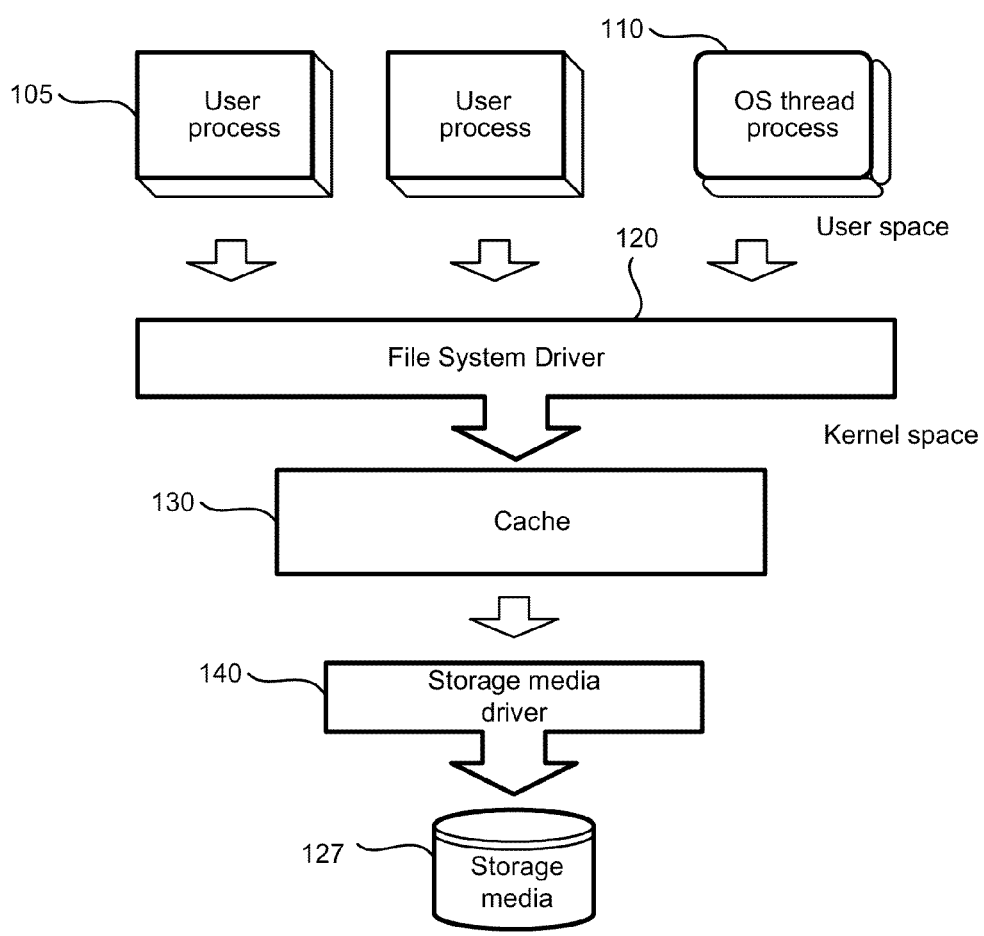
FIG. 1 illustrates processes and drivers in a computer system, in accordance with the exemplary embodiment.

The file systems can be of several categories based on file types: the housekeeping data of the file system volume, file metadata, file data, and free space not occupied by the other data. A file system driver embedded into the operating system can provide servicing for the file system. FIG. 1 illustrates an exemplary processes and architecture of a computer system, 100. The computer system 100 includes a data storage device 150 accessible by one or more user processes 105 or OS thread processes 110. OS user processes 100 or OS thread processes 110 can request to read or write data to and from the storage media 150 via a file system request.

This request can be directed to a file system driver 120, which defines where in the storage media the relevant data blocks are located. The request can then be directed (optionally) to the OS cache 130, where the requested data is currently cached. If the requested data is located in the OS cache 130, the system can complete the requested operation by allowing the user process 100 or OS thread process 110 to perform a read/write operation on the cached data. If the requested data is not located in the cache 130 or is otherwise unavailable (e.g., the space in the cache must be freed up pursuant to an OS algorithm), the request is transmitted for execution to the storage media driver 140. Subsequently, the storage media driver 140 performs the requested operation on the selected data located in the storage media 150.

The storage media driver 140 interacts with the storage media 150 in a block mode. In the context of data management, a block is a group of records on a storage media, usually the smallest addressable entity on a disk. Blocks are typically manipulated as units. For example, a disk drive can read and write data in 512-byte blocks. Accordingly, the storage media driver 140 can receive requests for data read and write using blocks of the selected block size.

Each data block is associated with a number or label corresponding to the type of the operation to be performed. Thus, the driver associated with the data write operation acquires a set of numerical pairs (e.g., a data block and a number) in order to process the data write command.

Figure 2:
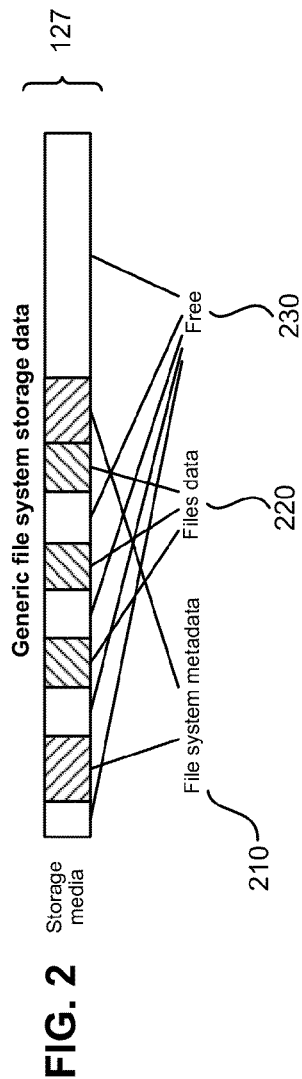
FIGS. 2-4 illustrate exemplary embodiments of the storage media, including an block data container, in accordance with the exemplary embodiment.
Figure 3:
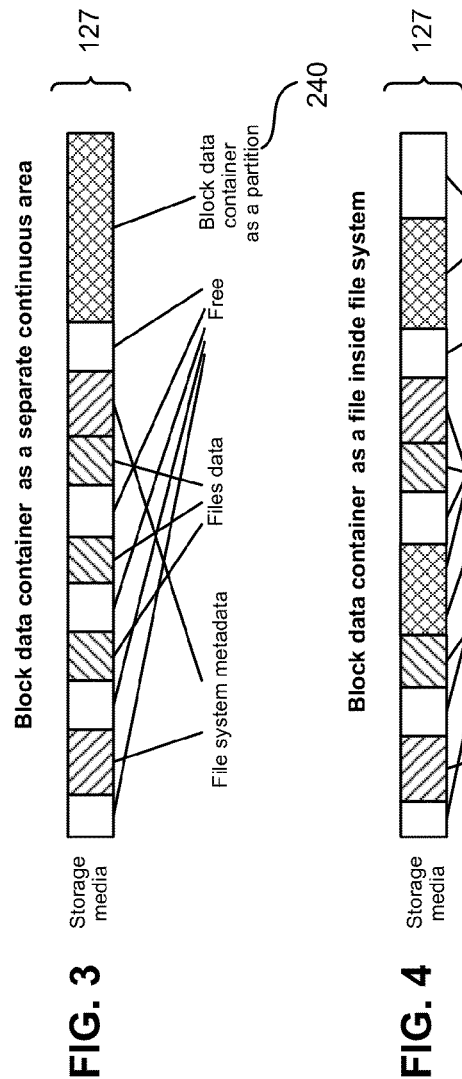
Figure 4:
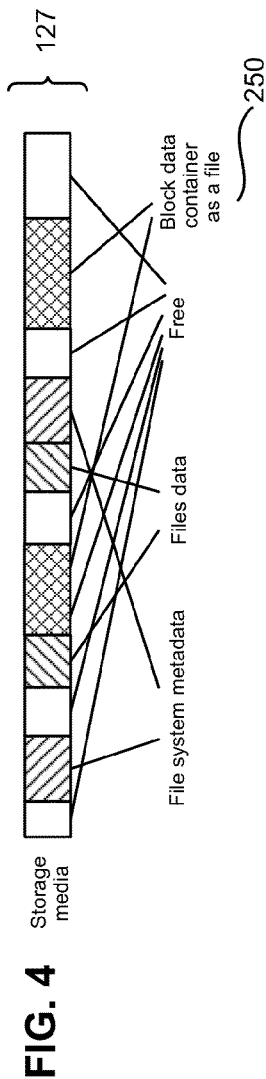

FIGS. 2-4 illustrate an exemplary embodiment of the system storage device. Storage media 127 is a file system storage data device or location. From the point of view of the file system, the blocks of data stored in the block data storage medium 127 can be characterized into several different classes. Depending on the file system type, the storage medium 127 can store data specific for the volume, metadata of the file system 210, file data 220, or free space 230 not currently taken by other data. Generally, a specific data type may be allocated to an entire data block and different data types cannot be combined in one block. But under specific circumstances, a file system may combine different data into one block (e.g., ReiserFS or Microsoft Windows NTFS).

Thus, by copying all data blocks that are not free (e.g., all blocks except entirely free blocks 230), the system may obtain a file system snapshot that serves as a copy of its state at a current moment of time. Although listing the file system blocks is not a requirement. In the event this information cannot be acquired by the system, the block fetching procedure may select all of the blocks associated with storing any file system data, including free blocks.

Note that once the snapshot is created, a block write to the disk can take place. In this case, if the data from the disk is not copied elsewhere, e.g., to another location or another storage device, then the snapshot will no longer correspond to the previous state of the disk, but to the current state of the disk. Thus, in order to conform snapshotted data with any specific state at a given moment, the shapshotted data must not change.

Typically, this task is not difficult if the data storage and the file system associated with the storage are not connected to any active computer or is otherwise blocked from data modification. Basically, the risk of nonconforming data is reduced if there are no processes able to modify data, so block data container (intermediate data storage container) can be used for resolving this problem (240, 250).

Figure 5A:
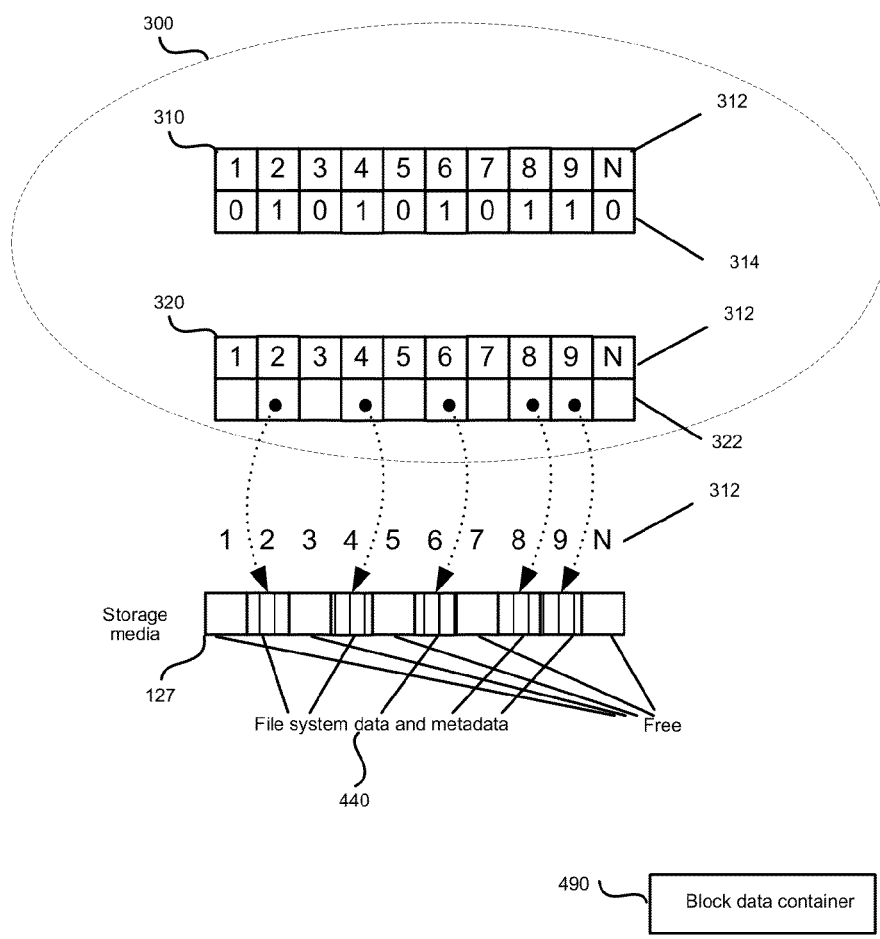
Figure 5B:
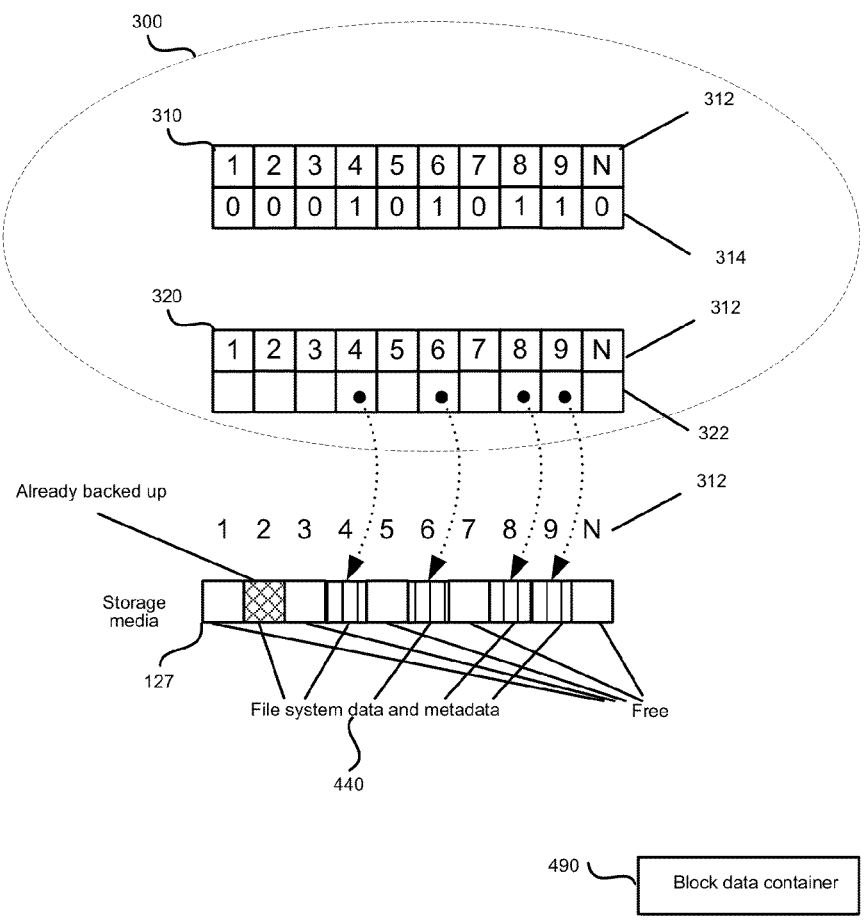

FIG. 5A-5C illustrates an exemplary embodiment of the online backup process that addresses the shortcomings of offline data backup. FIG. 5A shows a snapshot 300 of the storage 127, including a snapshot bitmap 310 and a map of the snapshot 320. The snapshot bitmap 310, in this case, user space bitmap is such that the drivers of the operating system are not used to create it. Rather, the storage medium (for example, a disk drive) is read directly, the file system structure is identified, and the data blocks that are being used are identified. It should be noted that although in the exemplary embodiment the bitmap is created on a data block level, it is possible that the bitmap build procedure is related to file system reflection into block space of the storage device, and considers only non-utilized blocks (vs. free blocks). An alternative embodiments creates a bitmap for clusters of blocks or for large structures being backed up as integral structures. Thus, those data blocks that are being used are tagged with, for example, a 1 in the bitmap, and those that are not used are tagged as 0 in the bitmap. Note that the size of the data block can be relatively large. For example, it may be larger than a typical sector in a hard disk drive. In other words, as discussed further below, there may be a need for a further step that determines which part of the data block is actually being used, if the data block is relatively large. Note that the values used in the bitmap can be not only binary 0 and 1. As another option, for example, the bitmap can be used to store information about bad blocks. Note also that the bitmap can be created and managed in user space, or, alternatively, in OS kernel space.

The bitmap of the snapshot contains in numbers of the data blocks of the data storage 127 (in this case, as an option, the sectors of the data storage 127), and the bit that corresponds to each block number of the data storage 127. As may be seen from the figures, after creating the snapshot 300, and the snapshot bitmap, the bit is marked as 1 for each block that contains data (or for those sectors that are defined during the generation of the snapshot 300), for example, sectors 2, 4, 6, 8 and 9 of the data storage 127. This means that the sectors of the data storage 127 will later be backed up. All other sectors of the data storage 127 are either empty or are not defined as subject to backup when creating the snapshot, and are marked with a 0.

The snapshot bitmap 320 defines the location of the data described in the bitmap. After creation of the bitmap 300, and prior to a first write to the data storage 127 in to the blocks or sectors marked with a 1 in the bitmap, the snapshot bitmap 300 contains, typically, only the numbers of the sectors of the data storage 127, since after creation of the snapshot, the data, typically, are located on the data storage 127. However, after creation of the snapshot 300, the map of the snapshot can also contain links or pointers to the sectors of the data storage 127, as described further below.

FIG. 5B shows a situation where one or the next of the sector/data blocks (in this case, the sector number 2) that is marked in the bitmap 310 on FIG. 5A as 1, is already backed up (see data block 450). In this case, in the bitmap 310 of the snapshot 300, for sector number 2 a 0 is written. For the backup system, this means that this sector was already backed up, or, alternatively is empty, and therefore is available for writing into this block or sector. For additional detail, see U.S. patent application Ser. No. 11/459,978, Filed: Jul. 26, 2006; U.S. patent application Ser. No. 11/382,851; Filed: May 11, 2006, entitled SYSTEM AND METHOD FOR USING FILE SYSTEM SNAPSHOTS FOR ONLINE DATA BACKUP; U.S. patent application Ser. No. 10/925,928, filed Aug. 26, 2004, entitled SYSTEM AND METHOD FOR USING FILE SYSTEM SNAPSHOTS FOR ONLINE DATA BACKUP и в U.S. patent application Ser. No. 10/624,858, filed Jul. 22, 2003, entitled SYSTEM AND METHOD FOR USING FILE SYSTEM SNAPSHOTS FOR ONLINE DATA BACKUP, incorporated herein by reference in their entirety.

FIG. 5C, for purposes of illustration, the following example assumes that the backup process for the data of storage media (a data storage) 127 is launched such that the backup process may be performed within the off-line backup procedure. Initially, a user process or file system process 400, such as, for example, a disk cache, issues a write request 410 to the data storage 127 that is received by the storage device driver 420. In response to write request 410, the storage device driver 420 transmits modification requests, shown as 470 and 480, to the appropriate stored data. In this example, the modification requests 470 and 480 are directed to data that is subject to the backup process 440. Accordingly, the modification process may request the data area 450 that has already been copied to the backup storage 510 (i.e., request 470) or data 460 that has not yet been copied or backed-up (i.e., request 480). Request 470 can be performed without damaging the backed up data, because backup is a one-pass process that does not require a return to data areas that have already been processed. But, in conventional systems, request 480 cannot be performed because the integrity of the backed-up data can be adversely affected. For example, a modified block that does not belong to the given copy can penetrate into the backup copy. This can make the correct recovery of the file system state impossible because data may refer to different points in time. As a result, the integrity of the data would be compromised.

To solve this problem, one exemplary embodiment of the present invention includes a temporary (intermediate) data storage container (block data container) 490 designed to address the situations discussed above and utilizes a method of data backing up into a backup storage, described below.

The backup procedure of the present invention operates at the level of the underlying file system and may be implemented with a file system based on a block storage principle. The method of the present invention includes a procedure to define the data and metadata of the file system by the number of the block to which the subject data belongs. For internal purposes, the backup procedure efficiently defines which blocks have been copied or are subject to being copied.

As discussed above, the intermediate data storage container 490 may be any storage device suitable for storing data. For example, intermediate data storage 490 may be a temporary buffer based on the block design of the data storage 127. Intermediate data storage container 490 may be a memory located external to the backed up data storage space 510. Alternatively, or in addition, intermediate data storage container 490 may be placed in a dedicated part of the data storage space 127 or 510, which can represent a separate partition of the storage or as a file within the file system that has been reserved for the purpose of providing a temporary data storage container.

A procedure of the online backup with using intermediate container and snapshotting is described in U.S. Pat. No. 7,047,380, "System and method for using file system snapshots for online data backup", issued on May 16, 2006 to Tormasov, et al., and in U.S. Pat. No. 7,318,135, "System and method for using file system snapshots for online data backup", issued on Jan. 8, 2008 to Tormasov, et al., which are both incorporated herein by reference in their entirety.

Figure 6:
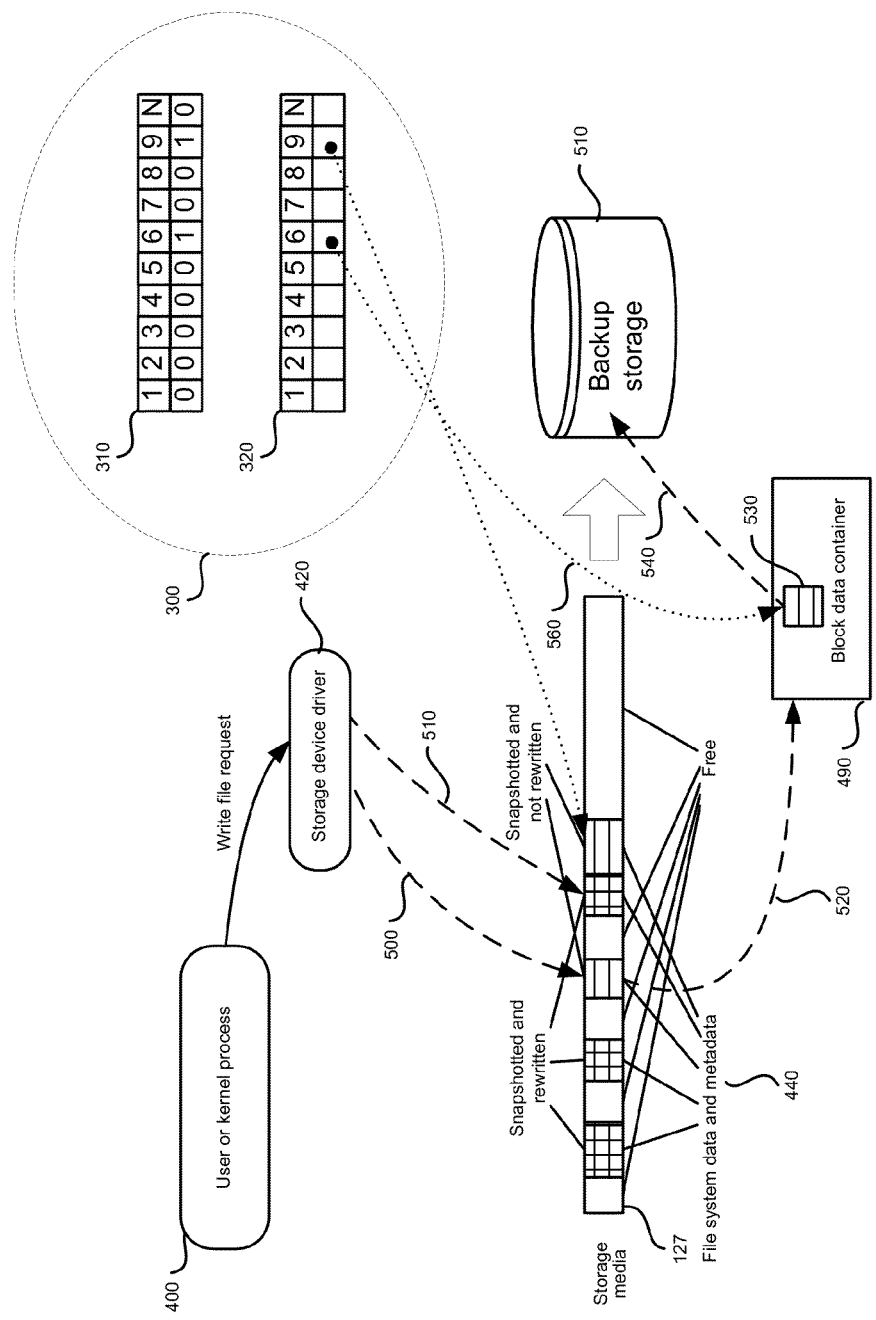
FIG. 6 shows an exemplary embodiment of the present invention in which the system utilizes a block data container to manage the block release process.

FIG. 6 shows an exemplary embodiment of the present invention in which the system utilizes a block data container to manage the block release process. When the data storage device driver (420 in FIG. 5) receives a request to write a block into the area already copied by the backup procedure 510, the required write is performed without limitations. But, if the incoming write request (shown as 500 in FIG. 6) is directed to an area not yet backed up, then the write process is suspended and the current state of the given data area is copied to the intermediate data storage container 490, as shown at 520 in FIG. 6. When the copy procedure is completed, the pointer in the map of the snapshot 320 for sector number 6 changes, and now points not to the data block or sector in the data storage 127, but to the data block stored in the data container 530 (shown as 560).

Also when the copy procedure of data area to the intermediate data storage container 490 is completed, the system will allow the write procedure 500 to be executed. Thus, the content of the data block, shown as 530, at the moment the backup procedure commenced is stored in intermediate block container 490. The content 530 will be copied from container 490 by the backup procedure when required, as shown at 540. The block will be flagged and the backup process will continue. Note that the write procedure may be executed in parallel with the process of copying data from the intermediate block container to the backup storage device 510. Accordingly, the system need not wait until the original write operation is complete to initiate the backup copy operation. Moreover, the step of writing the content of the intermediate block container 490 into the backup storage device 510 may be performed in a substantially asynchronous manner (e.g., it is not necessary to wait until the intermediate block container 490 is flushed to process the next incoming block write request if the container 490 has not over-flowed). Thus, the delays that result from writing to the storage media are reduced to a minimum and the programs running on the computers connected to the data storage can continue working substantially without pause.

Data from the intermediate storage container can be re-written to the backup storage when the write procedure of data located in the storage media has been completed or at any other appropriate time.

Figure 7:
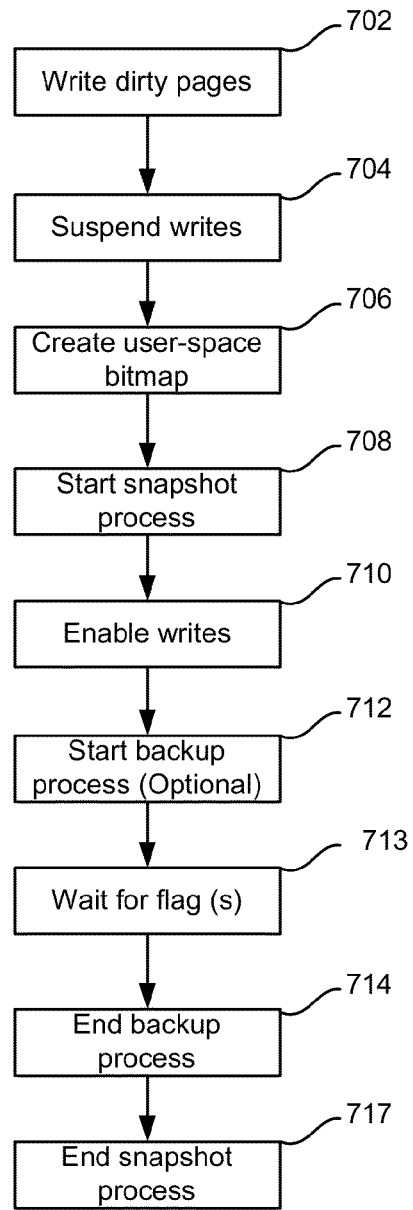
FIG. 7 illustrates an alternative embodiment of the present invention.

FIG. 7 illustrates an alternative embodiment of the present invention. As shown in FIG. 7, the first step can be writing the "dirty pages" from the cache to storage (step 702). Dirty pages are pages in an OS cache that contain information to be written into a storage device, but that have not been written due to an OS policy or other OS mechanisms (for example, a "lazy write" approach used in some modern OS). The next step (step 704) suspends write operations. These suspended write operations are added to a special list, and a parameter is returned to the operating system, informing the operating system that these write operations have a "pending" status. In other words, the operating system will know that the write command execution has been postponed until later.

In step 706, a user space bitmap is created. The bitmap is such that the drivers of the operating system are not used to create it. Rather, the storage medium (for example, a disk drive) is read directly, the file system structure is identified, and the data blocks that are being used are identified. It should be noted that although in the exemplary embodiment the bitmap is created on a data block level, it is possible that the bitmap build procedure is related to file system reflection into block space of the storage device, and considers only non-utilized blocks (vs. free blocks). An alternative embodiments creates a bitmap for clusters of blocks or for large structures being backed up as integral structures. Thus, those data blocks that are being used are tagged with, for example, a 1 in the bitmap, and those that are not used are tagged as 0 in the bitmap. Note that the size of the data block can be relatively large. For example, it may be larger than a typical sector in a hard disk drive. In other words, as discussed further below, there may be a need for a further step that determines which part of the data block is actually being used, if the data block is relatively large. Note that the values used in the bitmap can be not only binary 0 and 1. As another option, for example, the bitmap can be used to store information about bad blocks. Note also that the bitmap can be created and managed in user space, or, alternatively, in OS kernel space.

In step 708, the snapshot process begins. A snapshot process is described in U.S. Pat. No. 7,047,380, "System and method for using file system snapshots for online data backup", issued on May 16, 2006 to Tormasov, et al., and in U.S. Pat. No. 7,318,135, "System and method for using file system snapshots for online data backup", issued on Jan. 8, 2008 to Tormasov, et al., which are both incorporated herein by reference in their entirety. Note that the snapshot process may run asynchronously. In other words, once the snapshot process is launched, it can proceed in a separate thread.

In step 710, the write operations are enabled. In step 712, the backup process is started. A backup process is described in U.S. Pat. No. 7,047,380, "System and method for using file system snapshots for online data backup", issued on May 16, 2006, and in U.S. Pat. No. 7,318,135, "System and method for using file system snapshots for online data backup", issued on Jan. 8, 2008, which are both incorporated herein by reference in their entirety. Note that the backup process is also in asynchronous process, usually implemented as a thread. Also, note that a snapshot process and a backup process can be either synchronous or (preferably) asynchronous relative to each other. Synchronization can be performed using access to the bitmap as a serialization mechanism. In step 714, once a flag is received (step 713) that the backup process is completed, the snapshot process can end (step 717). The backup process designated by may be started if the user needs a possibility of backing up the storage device while rootkit detection is taking place. This may be needed, for example, for subsequent disk restoration. On the other hand, if the sole purpose is the rootkit detection, the backup process is not required.

In another alternative embodiment, the backed up data might not be used for subsequent restoration, for example, if the rootkit(s) are detected on the snapshot and subsequent restoration may cause restoration of rootkit(s). In such cases rootkits may be deactivated or neutralized after detection of their presence on the data storage device (storage media) whose content differs from current content being snapshotted, due to operation of user applications and/or system processes performed in OS.

It should be noted that rootkit deletion, deactivation or neutralization is a separate problem from backup, requiring additional steps. The most common approach is deleting or clearing blocks of the storage device containing rootkit code. Further steps can include deleting footprints of the rootkit from the system, for example, registry settings, corrupted by rootkits software, and so on. All these steps should be performed without assistance of the OS, for example by deleting codes while rebooting the OS, by booting computer system with another OS system that is known to be uncorruptable by the particular rootkits, or using the trusted software means. Another option includes restoring the storage device from backup known to be free of rootkits and viruses.

Figure 8:
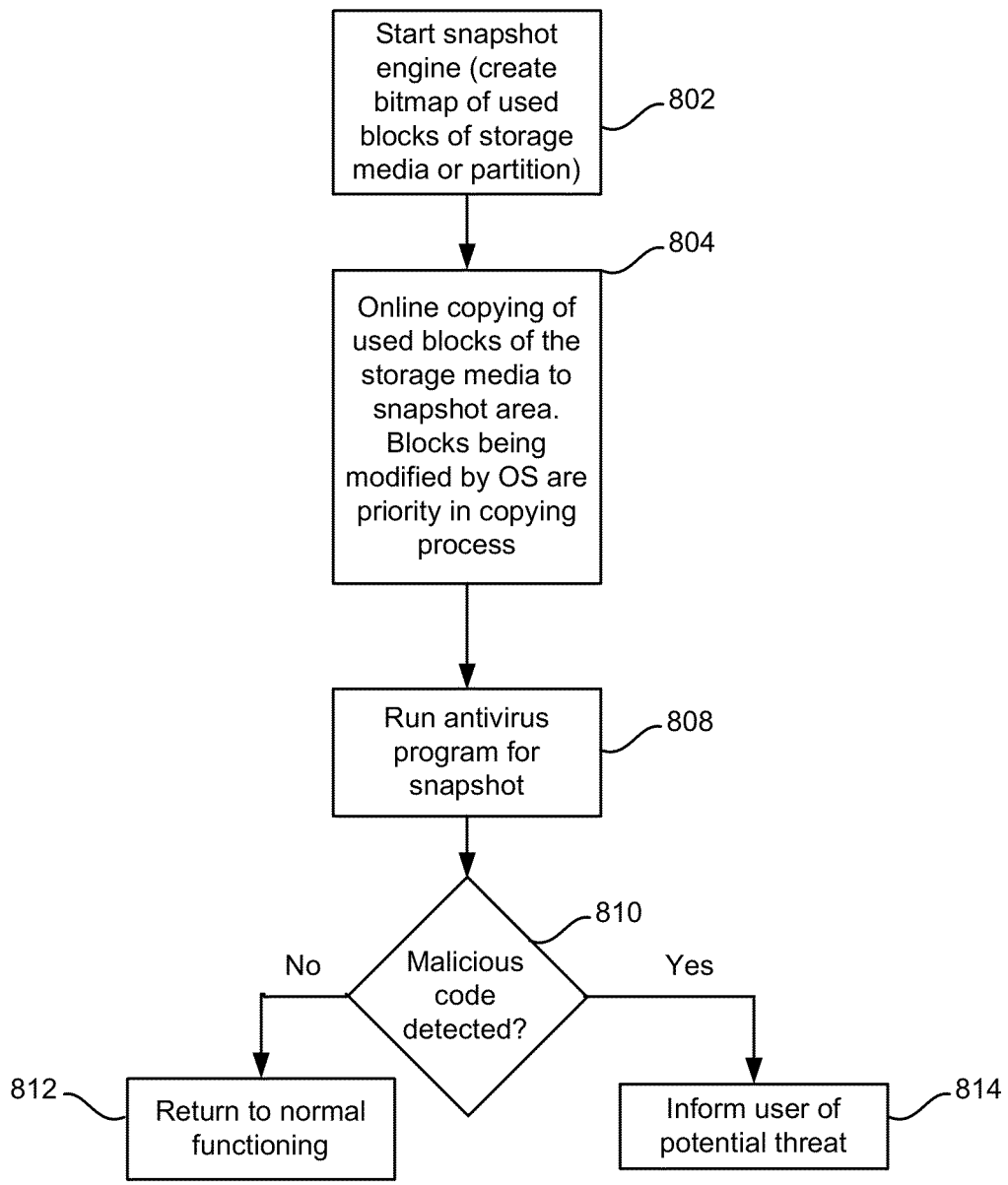
FIG. 8 illustrates the algorithm of one embodiment of the present invention in flowchart form.

FIG. 8 illustrates the algorithm of one embodiment of the present invention in flowchart form. As shown in FIG. 7, in step 802, the snapshot engine is started, and is used to create the bitmap, as discussed earlier. In optional step 804, the process of online copying of the used blocks to the snapshot area is performed. The blocks that are being modified by the operating system are the priority of the online copying process. Other alternative embodiments of snapshot blocks protection analogous to step 804 are described earlier. In step 808 the rootkit detection procedure (such as antivirus program) is run.

Note also that the rootkit and virus detection procedure can include both scanning of the data based on the snapshot using an antivirus and also look for hidden files from the file system, or/and fingerprints/signatures of rootkits, viruses and other malware. Once the hidden file is detected, its name, fingerprint, signature, part of the name, part of the file or other characteristic of a rootkit/antivirus can be compared, for example, with a rootkit/antivirus database.

To identify a particular virus or rootkit, the signature needs to be unique and characteristic for that particular virus or rootkit. Usually, when comparing the data from the current state of the disk and the data in a snapshot, if a file that is hidden from the file system is found, then that file should be treated as a potential virus or malware.

The signature/fingerprint can be calculated in different ways, for example, as a signature or fingerprint, a hash value applied to different parts of the code of the virus or rootkit can be used. Alternatively, a cyclic redundancy check or a control sum can be calculated for the entire code of the virus, or for only part of the code. Signature analysis involves identifying characteristic properties of each virus, and then searching for other viruses by comparison of file contents or characteristic values of the files (hashes, CRCs, etc.) with the contents of the antivirus database. Typically, to more definitively identify a file as being infected with malware or virus, typically, either antivirus programs or antivirus databases need to be used, or a list of virus files needs to be consulted, or the interaction between the virus with the operating system and, the file system and various applications needs to be analyzed, for example, attempt to write to Microsoft Windows registry.

However, it should be noted that the use of an antivirus program is not, strictly speaking, necessary. To identify a file as a carrier of a virus for malware, it us sufficient to determine the presence or absence of certain files in the snapshot or backup, and on the on the hard disk drive or analogous storage, or by parsing the files, or by detecting changes in the operating system files or the file system or the application files, which normally should not be changed. In other words, to determine whether or not a computer is infected by a virus, it is sufficient to identify, in the snapshot, a virus or a portion of a virus or a rootkit. Since the system does not normally see the virus or rootkit files, all the files on the hard drive can be compared to the snapshot. The presence of some file in the snapshot that is not, supposedly, present in the hard drive indicates that such a file can be considered malware. Alternatively, additional AV checks can be performed, e.g., compare the file name or contents or signature with an AV database.

OS files that should not change could also be checked in the same manner. If the snapshot file is different from the file on the hard disk drive, then it is likely that the system is infected. Often, deleting such a file is not an option, since it is a system file, therefore, a file from a previous backup can be used, or a file from a trusted storage medium (e.g., a CD ROM, or network storage) can be used to replace the infected file. Also such file can be cured by a AV program.

In step 810 the rootkit detection procedure checks if any malicious code, rootkits, viruses, etc. has been detected. If not, then, in step 812, the system can return to normal functioning. If a malicious code has been detected, then, in step 814, the system can warn the user, or take some other repair action.

It should be noted that operating systems can run on the same hardware system or on different hardware systems.

Figure 9:
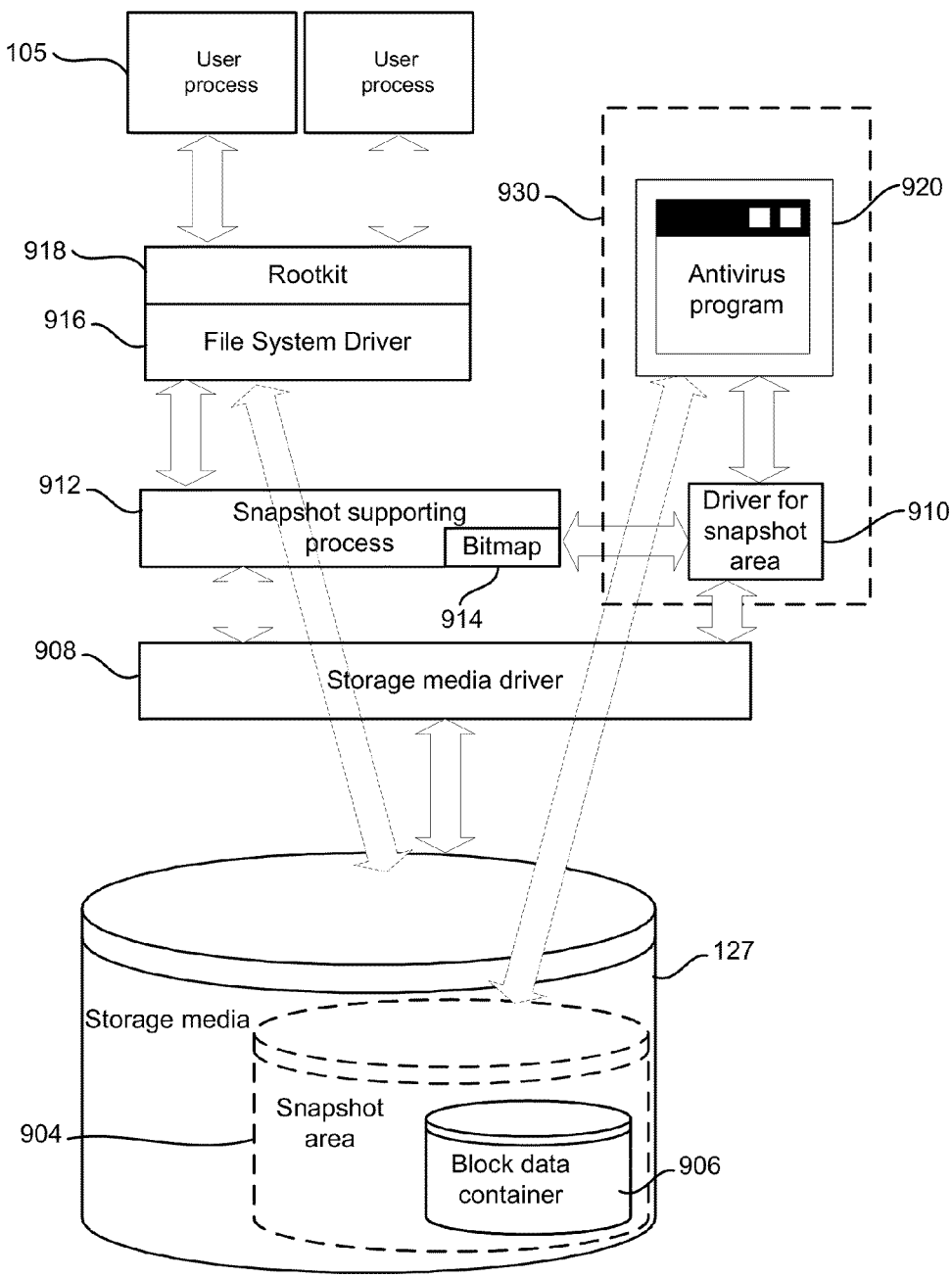
FIG. 9 illustrates one embodiment of the present invention as it relates to rootkit detection.

FIG. 9 illustrates one embodiment of the present invention as it relates to rootkit detection. Dotted arrows show paths of virtual reads and writes from the point of view of the file system driver and an additional driver for reading data from the storage media based on the snapshot. The snapshot area 904 is a set of storage media blocks used at a certain point in time, and whose content needs to be saved (or protected). The snapshot container 906 is a disk area, where content of the snapshot area's blocks is stored. In a preferred embodiment, blocks or other structures of the snapshot container 906 are physically the same as corresponding blocks of the snapshot area 904. In this example, the blocks of the "snapshotted" area are not copied to other locations, instead, results of writes to the snapshot area 904 are stored in the intermediate storage (not shown) and are used by the file system driver 916 via snapshot engine (snapshot supporting process) 912 as blocks of the actual storage with the support of the bitmap 914, where blocks being stored in the intermediate storage are reflected.

Furthermore, the process of copying blocks that are in the process of being rewritten and/or with overflowed intermediate data storage container is implemented as a background process, or as an online process, as described in U.S. Pat. No. 7,047,380, "System and method for using file system snapshots for online data backup", issued on May 16, 2006 to Tormasov, et al., and in U.S. Pat. No. 7,318,135, "System and method for using file system snapshots for online data backup", issued on Jan. 8, 2008 to Tormasov, et al., which are both incorporated herein by reference in their entirety. FIG. 9 illustrates locating the snapshot container 904 (that may be used as backup storage) on the same drive as the snapshot area. The protected snapshot area 904 is reduced as the snapshot container 906 is filled with blocks of snapshot area. Thus, if all blocks of snapshot area 904 are "overwritten," the snapshot container 906 is equal to snapshot area.

As further shown in FIG. 9, a number of user processes 105 are running on the system. These processes interface to a file system driver 916, with the rootkit 918 embedded between the user processes and the file system driver. A storage media 127 is used as a real storage medium, with the snapshot area 904, and an online snapshot container 906. The snapshot area 904, once the snapshot is complete, contains the data that needs to be stored, or backed up, at some particular point in time. The snapshot container 906 therefore is an intermediate version, at some point between the start of the snapshot process and the time that the snapshot process ends. A storage media driver 908 is used to interface to the storage media 127. A snapshot process or a snapshot engine (snapshot supporting process) 912 is running, to effect the snapshot. This can be the online snapshot process as discussed earlier, or can be another snapshot mechanism, although the online snapshot process described above is preferred. The snapshot supporting process 912 preferably uses a bitmap 914, as discussed earlier.

In this example, the snapshot area is "frozen" and all writes performed by the operating system are redirected to the intermediate storage (not shown in this figure, discussed in the text earlier) that is reflected in the bitmap 914. In this implementation, the rootkit detection process 920 works with the area of the disk storage being dedicated and fixed from the moment of starting the snapshot process. In this discussion, the driver for snapshot area 910 can use the same bitmap 914 as snapshot engine (snapshot supporting process) 912 for identifying block of the snapshot, or it can use its own bitmap, since contents of blocks in the snapshot area 904 is not changed during the rootkit detection operation The driver for snapshot area 910 performs the same role as the standard file system driver, e.g., for NTFS, FAT, Ext2/Ext3, but also permits working with the snapshots as if the snapshot represented a separate volume or partition of the hard disk drive, a separate disk drive, or a partition of a virtual machine's hard disk drive, a separate virtual machine's disk drive.

Note also that the driver for snapshot area 910 can work with multiple snapshots simultaneously. As described above and below, the driver for the snapshot area 910 can work both the snapshot and with an ordinary data storage medium, for example, a hard disk drive. If, at time T1, snapshot 1 of volume 1 is created, and at time T2, snapshot 2 of volume 1 or of volume 2 is created and of the same or different storage medium, (in other words, it is possible to create a snapshot of both disk 1 and disk 2, either simultaneously or sequentially, and then work with the snapshots as if they were the disks themselves), 2) then the driver for the snapshot area 910 can be used to provide access to the snapshot 1 and to the snapshot 2, as well to the data storage medium (e.g., the hard disk drive), as well as to provide access to the hard disk drive and to a particular volume through the file system driver 916.

A driver for the snapshot area 910, such as a driver for the file system, organizes clusters into files and directories (which, strictly speaking, are files that contain lists of files in that directory). The driver for the snapshot area 910, using the bitmap 914 and the snapshot supporting process 912, tracks of which of the clusters is currently used, which ones are free, and which ones are marked as bad or corrupted. The driver for snapshot area 910 can work with a snapshot whose data can be located on the storage media 127, as well as in the intermediate container 906.

A driver for snapshot area 910 for the snapshot area is used by the rootkit detection process 920 to interface to the storage media driver 908, and then to the storage media 127. Collectively, the rootkit detection process 920 and the driver for the snapshot area 910 comprise a trusted execution area handler 930. In other words, there is a file system running under the control of some software that is in some sense "trusted"—i.e., this software is believed to represent a version of the, for example, an antivirus and operating system files and/or drivers that is virus-free and rootkit-free. The code for the trusted execution area handler can be loaded from a source that is a priori known to be uninfected, such as a CD ROM, secure network storage, etc. The trusted file system can have at least some operating system files (or all of them) and a trusted file system driver for interfacing to the trusted file system and to the data storage device, optionally, bypassing any host operating system mechanisms for accessing files and file systems. The rootkit detection process 920 therefore, in one embodiment can compare the current representation of files in the operating system with the files (and/or names of files) in the antivirus data base and, in the event of a conformity or discrepancy (depending on the situation), can notify the user, or take other action.

It should be noted that although in FIG. 9 the storage media 127, the snapshot area 904 and the snapshot container 906 are shown as being part of the same physical drive, this need not necessarily be the case. For example, one or all of these can be virtual drives, rather than physical drives. The online snapshot container 806 can be located on a different physical drive, on a different partition of the same drive, on a network drive, etc. Note that the optional writes to the intermediate storage are not shown in this figure.

Note also that after the snapshot is created, not only the snapshot can be checked for presence of malware/rootkits, but also backups created by using the snapshot (e.g., incremental backups) can also be checked for malware. In this case, the snapshot area driver needs to be replaced with a backup driver, which performs a similar function to a file system driver but permits access to the backup as if it were a separate volume or partition or disk drive. The snapshot area driver works in a similar manner to a standard file system driver, however, the driver is invisible to the rootkits and to other malicious software. The snapshot area driver addresses the snapshot supporting process 912, described above, and which, by using the snapshot and the bitmap, permits working with snapshots through the storage media driver 908 as if the snapshot represents a physical drive or a drive of a virtual machine.

Common malicious programs and rootkits typically hide their files from the file system (by inserting themselves above the file system driver 916, for example, by adding their own file system driver, which does not permit the system do detect its activities and malicious files). Thus, when scanning the contents of the storage medium, for example, the hard disk drive, such hidden files are invisible, and are often invisible even to the antivirus programs. However, it should be noted that since rootkits or other types of malware are not "above" the driver for the snapshot area 910, access requests to the snapshot by using this driver 910 and the snapshot supporting process, the bitmap 914 and the partition/volume driver 1008 and the storage medium driver 908, will permit addressing the snapshot as if it were a regular data storage medium, and identify the presence of hidden files.

Names or other identifying characteristics of a particular hidden file, such as fingerprints, signatures, control sums or CRCs, can then be compared with a database of such information for rootkits and other types malware. Also, cryptographic analysis can be used when, based on known basic virus code and based on known encrypted/suspicious code, keys and decryption algorithms are recovered, see, e.g., http:**www.cnews.ru/reviews/free/security2006/articles/evolution3/, then, the same algorithm can be applied to the encrypted portion of the code, resulting in a decrypted virus body.

The virus database and their identifying characteristics is available from many antivirus vendors, or can be generated independently.

Since rootkits and other types of malware often attempt to mask the results of their activities, i.e., hiding the processes and the files containing malicious code in order to make their identification by antivirus programs more difficult, and also can be installed in the form of drivers, kernel modules, as well as can alter operating system components (for example, in the system registry or in the system files of Microsoft Windows), the changes introduced by rootkits and other malware can be identified in this manner.

Note also that rootkits and other types of malware can often substitute one file for another at the level of the file system driver and above, which is impossible if the driver for the snapshot area 910 is used, which in effect becomes a trusted file system driver. Such a trusted file system driver is guaranteed to be not infected by the virus or rootkit, in other words, the rootkit cannot infect it, and cannot be located hierarchically "above it."

Once a virus, rootkit or other malware is identified in a file or group of files, the files can be removed, quarantined or cured, e.g., by erasing the blocks representing the file on the storage device 127, by updating the file table of the storage device 127, e.g., by changing the inodes in the inode table for Ext2/Ext3.

Figure 10:
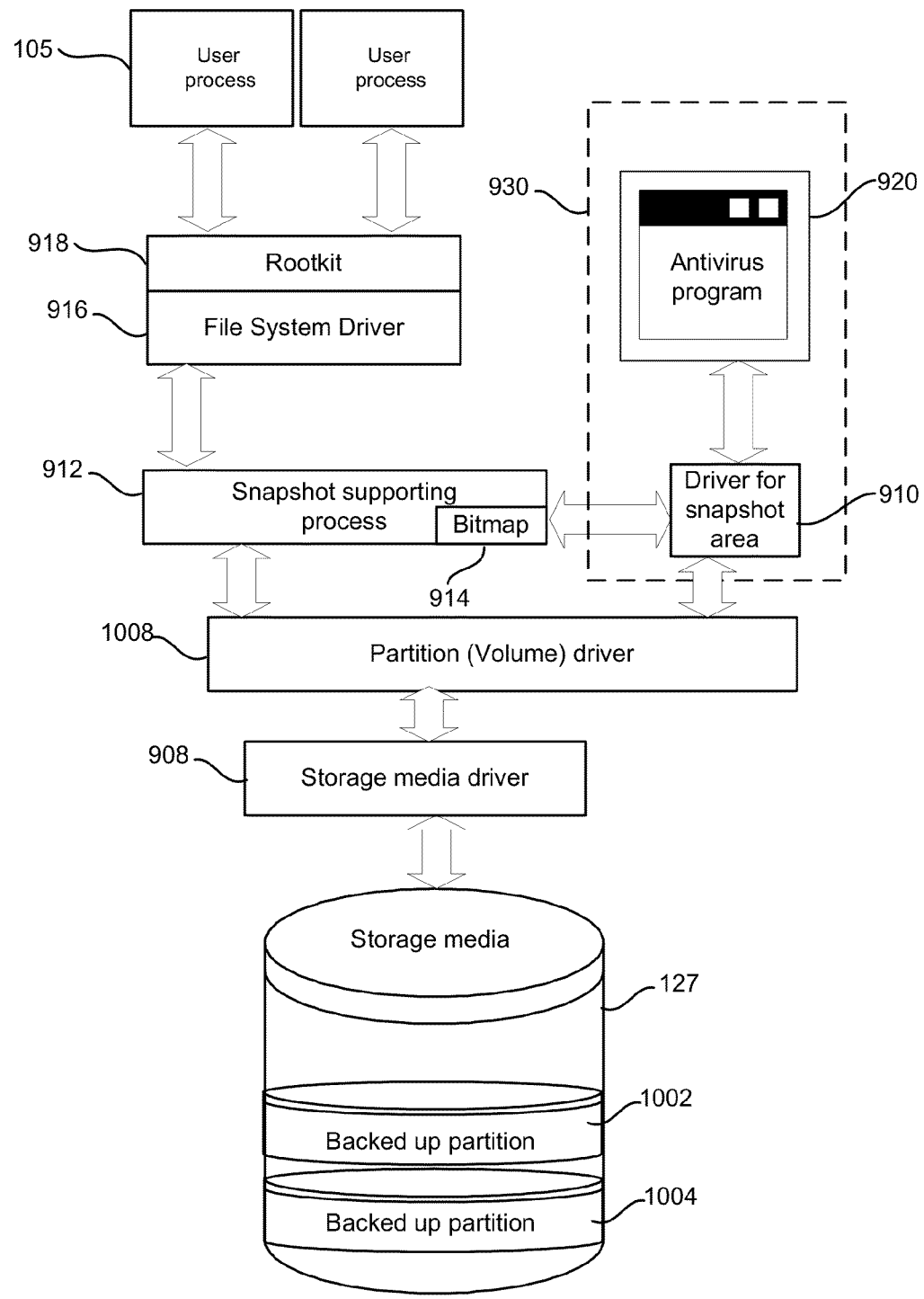
FIG. 10 illustrates an alternative embodiment of the invention.

FIG. 10 illustrates an alternative embodiment of the invention. In particular, FIG. 10 shows an embodiment, where the snapshot area and the snapshot container belong to different partitions of the same drives. In the earlier discussion, the unit of operation was the file, and the file system managed the files. As an alternative, the snapshot supporting process 912 can work with disk partitions, either real or virtual. Thus, as shown in FIG. 10, a partition (volume) driver 1008 is inserted between the snapshot supporting process 912, the driver for shapshot area 910, and the storage media driver 908. The snapshotting is performed on a partition basis, and the storage media 902 has a backed up partition 1002, and a partition that is in the process of being backed up 1004.

As yet another embodiment, a method for identifying a rootkit running on a physical computer includes starting a host operating system on the physical computer with a data storage device of the physical computer; starting a trusted software component running simultaneously with the operating system and having operating system privileges, wherein the trusted software component has access to the data storage device, wherein the trusted software component is known to be rootkit-free, and wherein the trusted software component uses a trusted file system with at least some operating system files and a trusted file system driver for interfacing to the trusted file system and to the data storage device; starting a backup process of a current state of the data storage device of the physical computer, wherein a common Application Process Interface (API) layer is used by both the trusted file system driver and by the host operating system to access the data storage device; providing access to the data storage device to processes running under the control of the host operating system; starting a parsing procedure under control of the trusted software component; and providing, to the parsing procedure, access to data representing the current state of the data storage device from the trusted software component. The parsing procedure uses the trusted file system driver to access the operating system files of the trusted software component, and the parsing procedure analyzes the backed up state of the data storage device for the malicious code by comparing files of the trusted software component with files of the host operating system to identify malicious code in the files of the host operating system. The intermediate storage can be any of (i) a separate partition of the data storage device and (ii) a file within a file system of the host operating system, and writes to the intermediate storage are performed asynchronously, and a size of the intermediate storage is equal to an amount of data that needs to be stored in the intermediate storage.

Figure 11:
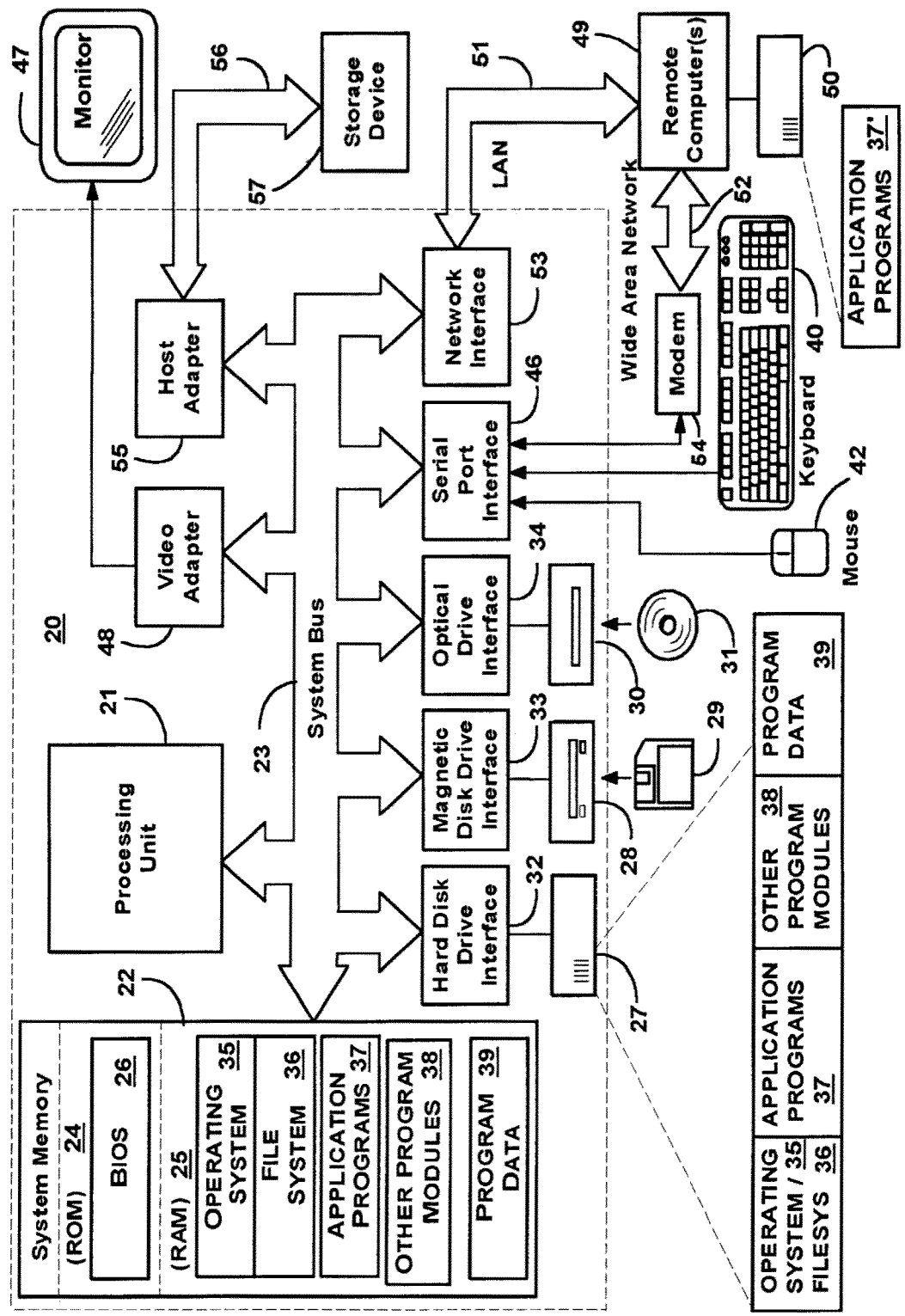
FIG. 11 illustrates an exemplary computer system, on which the exemplary embodiments can be implemented.

With reference to FIG. 11, an exemplary system for implementing the invention includes a general purpose computing device in the form of a computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for identifying malicious code running on a computer having a data storage device, the method comprising:
   starting an operating system on the computer;
   starting a trusted software component running simultaneously with the operating system; performing an online snapshot process of a current state of the data storage device to store a snapshot of the storage media in a backup storage area, performing the snapshot process including:
      creating a map of the storage drive absent using drivers of the operating system, the map identifying areas of the data storage device to be copied;
      upon receipt of a write request to write a block into an area, determining if the area has been previously copied to the backup storage area by the snapshot process;
      for areas not previously copied by the snapshot process, copying data blocks that need to be re-written from the storage device to intermediate storage and updating a pointer in the map of the snapshot;
   analyzing data representing the snapshot of the storage media via the trusted software component for snapshot area to detect malicious code; and
   replacing files with detected malicious code with trusted/malicious code-free copies of the files.

2. The method of claim 1, wherein a backup is created based on the snapshot, and further comprising performing an analysis of data representing the backup of the storage media via the trusted software component for backup area to detect malicious code.

3. The method of claim 1, wherein, after detection of the malicious code the malicious code is removed from the file in which the malicious code was detected, without otherwise damaging the file.

4. The method of claim 1, further comprising deleting the file in which the malicious code was detected.

5. The method of claim 2, wherein contents of the intermediate storage are used for restoring a previous state of a storage device and are copied to the backup storage as an incremental backup upon user command.

6. The method of claim 2, wherein data blocks of the intermediate storage are copied to the backup storage as an incremental backup.

7. The method of claim 1, wherein the trusted software component is an antivirus.

8. The method of claim 7, wherein the malicious code is detected by the trusted software component using a comparison with a database of names, fingerprints, signatures, control sums, or CRCs.

9. The method of claim 8, wherein the malicious code is rootkit.

10. The method of claim 8, wherein the malicious code is a computer virus.

11. The method of claim 8, wherein the files being analyzed are hidden files.

12. The method of claim 8, wherein the files being analyzed are hidden from the file system.

13. The method of claim 8, wherein the files being analyzed are hidden from an antivirus program.

14. The method of claim 1, wherein the trusted software component includes a procedure that compares characteristic properties of files on the storage medium with properties stored in a database.

15. A method for identifying malicious code running on a computer having a data storage device, the method comprising:
   starting a trusted software component running simultaneously with the operating system, wherein the trusted software component has access to the data storage device;
   performing a backup process of a current state of the data storage device, performing the backup process including:

creating a map of the storage drive absent using drivers of the operating system, the map identifying areas of the data storage device to be copied;

upon receipt of a write request to write a block into an area, determining if the area has been previously copied to the backup storage area by the backup process; and for areas not previously copied by the backup process, copying data blocks that need to be re-written from the storage device to intermediate storage and updating a pointer in the map of the snapshot; and copying the data from the intermediate storage to the backup storage area;

providing access to the data storage device to processes running under the control of the operating system;

using a trusted software component to scan the backup of the storage media via the trusted software component for detecting malicious code.

16. The method of claim 1, wherein the trusted software component has the same privilege level as the operating system.

17. The method of claim 1, wherein performing the online snapshot process further comprises copying the data from the intermediate storage to the backup storage area.

* * * * *

UNITED STATES PATENT AND TRADEMARK OFFICE
CERTIFICATE OF CORRECTION

PATENT NO. : 8,856,927 B1  
APPLICATION NO. : 12/954454  
DATED : October 7, 2014  
INVENTOR(S) : Serguei M. Beloussov and Maxim V. Lyadvinsky Page 1 of 1

It is certified that error appears in the above-identified patent and that said Letters Patent is hereby corrected as shown below:

In the Claims

Column 16, Line 32, In Claim 5, delete "are" and insert -- area is --

Column 16, Line 36, In Claim 6, delete "are" and insert -- area --

Signed and Sealed this  
Third Day of February, 2015

Michelle K. Lee  
*Deputy Director of the United States Patent and Trademark Office*